April 26, 1955

L. T. SZADY 2,707,038

ONE WAY CLUTCH

Filed Feb. 5, 1951

INVENTOR.
LEOPOLD T. SZADY.
BY
Whittemore Hulbert & Belknap
ATTORNEYS

United States Patent Office 2,707,038
Patented Apr. 26, 1955

2,707,038

ONE WAY CLUTCH

Leopold T. Szady, Detroit, Mich., assignor to Formsprag Company, Van Dyke, Mich., a corporation of Michigan Application February 5, 1951, Serial No. 209,354

3 Claims. (Cl. 192—41)

The invention relates to one-way clutches of that general type including rotary driving and driven members having spaced concentric raceways and a series of sprags located in the space between said raceways for transmitting torque therebetween in one direction only.

It is the object of the instant invention to obtain a simple constructiton of torque transmitting means which may be inserted as a unit in the space between the raceways.

It is a further object to obtain a construction which may be molded as an integral unit of material having the requisite resiliency.

With these objects in view the invention consists in the construction as hereinafter set forth.

In clutches of the type provided with a sseries of sprags, it is necessary to individually energize each sprag so as to move the same into individual contact with the respective raceways. With my improved construction all of the sprags of a series are integral but are formed of resilient material and are biased to frictionally engage and transmit torque from one raceway to the other when rotated in one direction relative to the latter but will revolve freely in the opposite direction. Preferably the material from which the torque transmitting member is formed is of a rubber-like nature and may be either rubber, natural or synetheic, a molded plastic, a molded fabric or laminated shim stock material.

Figure 2:
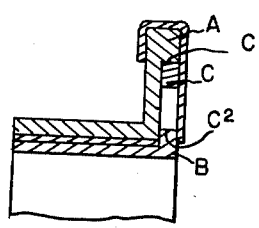
Fig. 2 is a section on line 2—2, Fig. 1.
Figure 1:
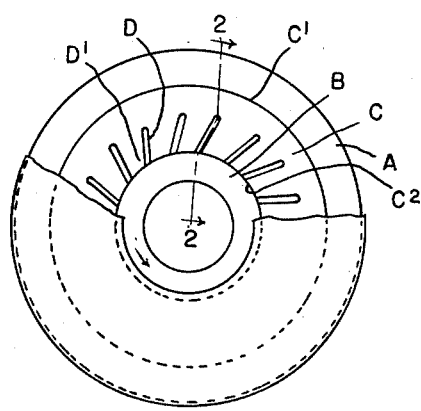
Fig. 1 is an elevation of the clutch with the cover removed.

As shown in Fig. 1, A and B are concentric raceways on independently rotatable members which are radially spaced from each other and are of substantially cylindrical form. C is the torque transmitting member which is an annulus having its outer peripheral surface C' frictionally engaging the raceway A and the inner peripheral surface C² engaging the raceway B. One of these peripheral surfaces is not continuous but is separated by slots D into a series of segments D' which extend for a portion of the dimension between the surfaces C' and C². The slots D instead of extending radially are inclined slightly to the radius at each location. Thus as shown in Fig. 1, the slots D extend outward from the inner periphery C² of the member C and are so inclined that rotation of the inner raceway counterclockwise will slightly bend each of the portions D' to relieve friction between the same and said raceways. Consequently torque will not be transmitted from the raceway B to the raceway A. On the other hand if the direction of rotation of the raceway B is clockwise torque will be transmitted by the member C from the raceway B to the raceway A. This is for the reason that each of the portions D' between the slots D extends at an angle to the surface of the member B which is within the angle of friction and operates in effect the same as an individual sprag arranged at the same angle. If it is desired to reverse the direction of rotation in which the engagement of the clutch occurs, it is only necessary to reverse the member C end for end.

Figure 3:
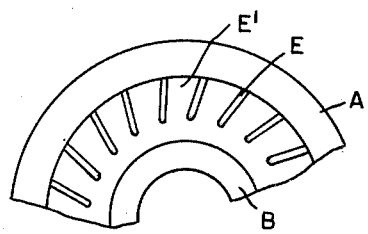
Fig. 3 is a view similar to a portion of Fig. 1 showing a modified construction.

With the modified construction illustrated in Fig. 3 the slots E extend from the outer periphery inward, each at a slight angle to an adjacent radial line. This will form a series of portions E' which operate as sprags for transmitting torque when the rotation is in one direction and freely rotating in the opposite direction.

The clutch as above described can be manufactured at very low cost and requires little skill for its installation. It is designed chiefly for operating under light loads but, nevertheless, is capable of transmitting fairly high torque.

What I claim as my invention is:

1. A one-way clutch comprising rotary driving and driven members, one sleeved upon the other and both having at one end thereof adjacent radially outwardly projecting disk portions rigid therewith, one extending radially beyond the other and provided at its periphery with an annular shoulder extending axially over the other inner disk, an annular disk formed of resilient rubber like thin sheet material occupying the space between said annular flange and inner disk and having its outer and inner peripheries, respectively, in frictional contact therewith, said resilient disk having a series of slots extending from one periphery part way through the disk, each slot being at an oblique angle to an adjacent radial line thereby forming intermediate sprag portions which are within the angle of friction as to rotation of said driving member in one direction and outside the angle of friction as to rotation thereof in the opposite dirction, and an annular member bearing against the opposite side of said resilient disk and in conjunction with said projecting disk portion on the other side of said resilient disk holding the latter in operative position.

2. The construction as in claim 1 in which the said slots extend inward from the outer periphery of the resilient disk.

3. The construction as in claim 1 in which the said slots extend outward from the inner periphery of said resilient disk.

References Cited in the file of this patent

UNITED STATES PATENTS

| | | |
|---|---|---|
| 1,924,579 | Waterhouse | Aug. 29, 1923 |
| 1,980,185 | Chilton | Nov. 13, 1934 |
| 2,079,527 | Rauen | May 4, 1937 |
| 2,245,431 | Critchfield | June 10, 1941 |
| 2,388,424 | Lund | Nov. 6, 1945 |